United States Patent
Kuts

(10) Patent No.: US 6,361,188 B1
(45) Date of Patent: Mar. 26, 2002

(54) METHOD AND APPARATUS FOR GENERATING THREE DIMENSIONAL LIGHT PATTERNS

(76) Inventor: Thomas A. Kuts, 380 Allen Way, Benicia, CA (US) 94510

( * ) Notice: Subject to any disclaimer, the term of this patent is extended or adjusted under 35 U.S.C. 154(b) by 0 days.

(21) Appl. No.: 09/687,840

(22) Filed: Oct. 13, 2000

(51) Int. Cl.[7] .............................. F21K 7/00; F21V 1/10; F21V 83/00
(52) U.S. Cl. ....................... 362/259; 362/86; 362/280; 362/284; 362/231; 362/323; 362/811; 40/456; 40/502; 84/464 R; 353/15
(58) Field of Search .................... 362/86–88, 259, 362/280, 282, 284, 322–324, 230, 231, 234, 811; 84/464 R; 353/15, 99; 40/456, 502

(56) References Cited

U.S. PATENT DOCUMENTS

| | | | | |
|---|---|---|---|---|
| 3,318,187 A | * | 5/1967 | Prohaska | 353/15 |
| 3,590,681 A | * | 7/1971 | Cross | 84/464 R |
| 3,603,195 A | * | 9/1971 | Williams | 84/464 R |
| 3,757,106 A | * | 9/1973 | Bau et al. | 362/259 |
| 3,762,857 A | * | 10/1973 | Andeweg | 362/86 |
| 3,808,721 A | * | 5/1974 | Gersch | 40/502 |
| 3,892,478 A | * | 7/1975 | Lampkin | 353/15 |
| 4,006,970 A | * | 2/1977 | Slater et al. | 362/259 |
| 4,158,982 A | | 6/1979 | Chusid | 84/464 |
| 4,196,461 A | * | 4/1980 | Geary | 362/259 |
| 4,348,187 A | * | 9/1982 | Dotsko | 353/99 |
| 4,887,197 A | | 12/1989 | Effinger | 362/306 |
| 4,972,305 A | * | 11/1990 | Blackburn | 362/234 |
| 5,052,263 A | | 10/1991 | Feng | 84/464 R |
| 5,056,399 A | | 10/1991 | Hornstein | 84/464 R |
| 5,646,361 A | | 7/1997 | Morrow | 84/464 R |

OTHER PUBLICATIONS

Philip F. Schewe et al., American Institute of Physics, Physics News Update, No. 285 (Sep. 9, 1996).

* cited by examiner

*Primary Examiner*—Alan Cariaso
(74) *Attorney, Agent, or Firm*—McCutchen, Doyle, Brown & Enerson LLP; David G. Beck

(57) ABSTRACT

A method and apparatus for generating a three-dimensional image is provided. The system uses one or more laser beams directed at one or more mirrors. Each mirror is flexibly attached to the vibrating portion of a transducer such as a speaker, the transducer being coupled to a signal source. Suitable signal sources include radio and television tuners, CD players, tape decks, VCRs, musical instruments with suitable signal outputs, and signal generators. The laser beam(s) reflected by the mirror(s) is directed at a rotating viewing surface, the viewing surface being semi-transparent. Due to the rotation of the viewing surface, a three-dimensional image is formed that can be viewed from multiple angles.

19 Claims, 3 Drawing Sheets

METHOD AND APPARATUS FOR GENERATING THREE DIMENSIONAL LIGHT PATTERNS

FIELD OF THE INVENTION

The present invention relates generally to visual displays and, more particularly, to a method and apparatus for generating a three-dimensional light pattern.

BACKGROUND OF THE INVENTION

Light displays that are responsive to an audio signal, for example an audio signal generated by a music system, are known in the prior art. Such systems are used in a variety of commercial and non-commercial applications and may include light generated by lasers or incandescent bulbs as well as light viewed directly or projected onto a viewing screen or other medium.

U.S. Pat. No. 4,158,982 discloses a light show apparatus that utilizes an incandescent lamp and/or one or more stroboscopic flashtubes. The generated light passes through a horizontal transparent plate coupled to a voice coil, activation of the voice coil causing the transparent plate to vibrate. The upper surface of the transparent plate includes a plurality of particles that move in response to the vibration of the transparent plate. The plurality of particles may be transparent, translucent, or opaque and may be clear or colored. An optical system such as a prism and a lens system are used to focus the light onto a viewing surface.

U.S. Pat. No. 4,887,197 discloses a light display apparatus in which the light from a laser beam is reflected off of a front surface mirror to the viewing system. The mirror is mounted on a speaker that is coupled to a music system or other audio input. As the speaker vibrates in response to the frequency and amplitude of the input signal, the mirror vibrates causing the reflected laser beam to form a two-dimensional display pattern on the viewing surface.

U.S. Pat. No. 5,646,361 discloses a light display apparatus that utilizes a plurality of lasers mounted within a housing, the housing including a transparent window. The lasers, when actuated, are disposed to emit light beams generally towards the transparent window. The system is designed to actuate different lasers depending upon the frequency and amplitude of a signal from a music system.

What is needed in the art is a visual display that generates a three-dimensional image. The present invention provides an apparatus and a method for generating such a display.

SUMMARY OF THE INVENTION

The present invention provides a method and apparatus for generating a three-dimensional image. According to one aspect of the invention, one or more laser beams are directed at a mirror. The mirror is flexibly attached to the vibrating portion of a suitable transducer, for example a speaker, the transducer being coupled to a signal source. Suitable signal sources include, but are not limited to, radio and television tuners, CD players, tape decks, VCRs, musical instruments with suitable signal outputs, and signal generators. The laser beam(s) reflected by the mirror is directed at a rotating viewing surface, the viewing surface being semi-transparent. Due to the rotation of the viewing surface, a three-dimensional image is formed that can be viewed from multiple angles.

In at least one embodiment of the invention, multiple transducer/mirror pairs are used to enhance the three-dimensional image generated by the display system. Multiple lasers or a single laser in conjunction with one or more beam splitters are used as the light sources for the multiple transducer/mirror pairs.

A further understanding of the nature and advantages of the present invention may be realized by reference to the remaining portions of the specification and the drawings.

DESCRIPTION OF THE SPECIFIC EMBODIMENTS

Figure 1:
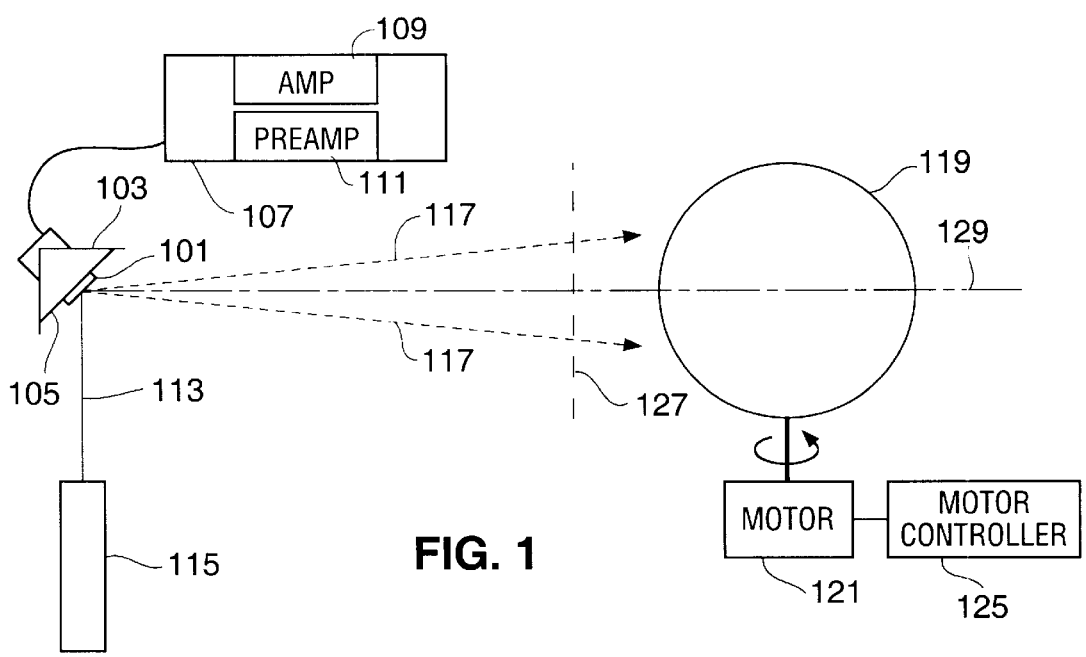
FIG. 1 is a schematic illustration of a display system according to the invention.

FIG. 1 is a schematic illustration of a display system 100 according to the invention. As shown, a mirror 101 is coupled to a transducer 103 using one or more coupling members 105, transducer 103 oscillating in response to an input signal from a source 107. In the preferred embodiment of the invention, transducer 103 is a speaker although it is understood that other types of transducers can be used with the invention (e.g., piezoelectric crystal). Typically signal source 107 is comprised of an amplifier 109 and a pre-amplified signal source 111. Pre-amplified signal source 111 can be the output of a tuner (e.g., television or radio), CD player, tape deck, VCR, musical instrument (e.g., electric guitar), or other source.

Coupling member(s) 105 is of non-rigid design, thus allowing mirror 101 to vibrate in response to the output of speaker 103. In at least one embodiment, multiple coupling members 105 extend across the diameter of speaker 103, each member being comprised of a flexible material (e.g., an elastomeric material). In this embodiment mirror 101 is attached at the intersection of the coupling members. In an alternate embodiment, a single coupling member 105 is used, the coupling member being comprised of a thin elastomeric diaphragm extending across, and fully covering, the front surface of speaker 103. In another alternate embodiment, mirror 101 is attached directly to a portion of speaker 103 with or without the aid of coupling members 105. Regardless of the technique used to couple mirror 101 to speaker 103, the mirror can either be centered or offset with respect to the centerline of speaker 103. The mounting location for mirror 101 is primarily driven by the desired range of mirror motion.

A light beam 113 from a light source 115 is directed at mirror 101 such that a reflected light beam 117 is directed generally at a viewing surface 119. In the preferred embodiment, light source 115 is a laser and beam 117 impinges on the surface of mirror 101 at a 45 degree angle. Viewing surface 119 is coupled to a motor 121 that rotates surface 119 along an axis 123. In the preferred embodiment of the invention, axis 123 is a vertical axis. Motor 121 is coupled to a motor controller 125. Preferably controller 125 allows the rotational speed of motor 121 to be varied.

Viewing surface 119 is semi-transparent, both transmitting and reflecting a portion of light beam 117. It is understood that in the context of this aspect of the invention, reflected light refers to both specular and scattered light. Similarly transmitted light refers to both specular and forward scattered light. Accordingly, surface 119 can be a semi-transparent mirrored surface or, as in the preferred embodiment, a thin, highly scattering, semi-transparent material (e.g., velum).

In the preferred embodiment of the invention, the portion of light transmitted by surface 119 is approximately equal to the portion of light reflected by surface 119. By making the brightness level for both the transmitted and reflected light approximately the same (i.e., approximately 50%), a user viewing the surface from the front (i.e., from the direction of incident light beam 117) will see the same intensity image as a user viewing the surface from the back. As a consequence, the user can view the image from any position relative to surface 119, as long as the user does not block incident light beam 117.

As previously described, light beam 117 is reflected by mirror 101. Due to the vibration of mirror 101 in response to input to speaker 103, a two-dimensional pattern is created by reflected beam 117 on a non-rotational viewing surface (e.g., a surface located in a plane 127). In the present invention, because of the rotation of viewing surface 119, a three-dimensional pattern rather than a two-dimensional pattern is created. The three-dimensional pattern is formed as a result of the intersection of light beam 117 with viewing surface 119 shifting as the viewing surface rotates.

Figure 2:
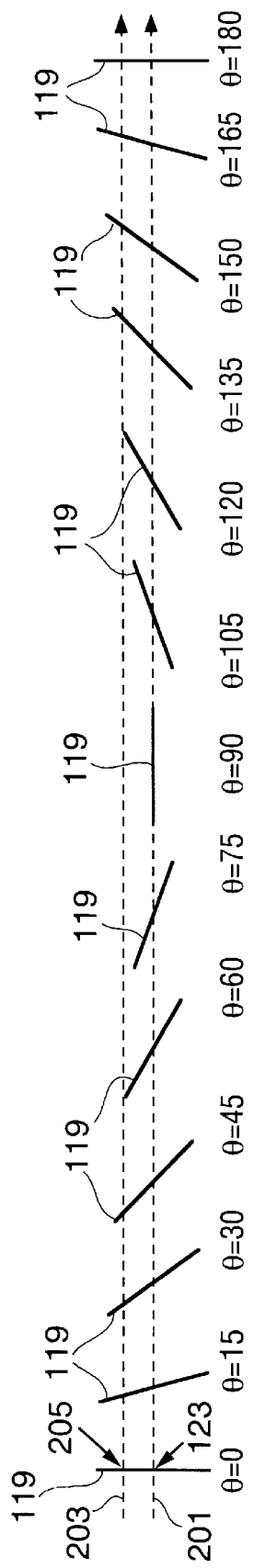
FIG. 2 illustrates the relationship between the intersection of the light beam and the viewing surface with the distance of the light beam from the rotational centerline of the viewing surface.

FIG. 2 illustrates the relationship between the intersection of light beam 117 and viewing surface 119 with the distance of light beam 117 from the rotational centerline of surface 119. In the example given in FIG. 2, surface 119 is shown rotating a half a turn (i.e., 180 degrees) about its axis, the rotation given in 15 degree increments. For comparison purposes, beam 117 is shown following two different paths. Path 201 intersects the rotational centerline of surface 119 while path 203 is approximately 30 equidistant between the rotational centerline and the edge of surface 119. As illustrated, when beam 117 follows path 201 it remains at the center of surface 119. When surface 119 is at 90 or 270 degrees, beam 117 intersects the edge of surface 119. In contrast, when beam 117 follows path 203 it travels between initial position 205 which, in this example, is equidistant from the rotational centerline and the surface edge, and the outer edge of surface 205. As illustrated, for a brief period of rotation beam 117 does not intersect surface 119 (i.e., in this example, when the degree of rotation is between 60 and 120 degrees). It is understood that although FIG. 2 correctly illustrates the shift of the intersection of the light beam and the viewing surface with surface rotation, in use beam 117 follows a path that is angled away from a centerline 129, as illustrated in FIG. 1, rather than a path that is parallel to centerline 129.

It should be understood that although the preferred embodiment of the invention is used to generate patterns that are linked to a specific audio source (e.g., music from a CD player), the invention can also be used to generate specific images (e.g., sphere, cylinder, etc.). In the latter case, a signal generator or other suitable means is coupled to transducer 103. If necessary, in addition to controlling the signal input to transducer 103 and the rotational speed of surface 119, laser beam 113 can be frequency and amplitude modulated.

Accordingly, and as described above, the present invention provides a method and apparatus for generating a three-dimensional pattern or image. The pattern or image is defined by the input to the transducer (e.g., speaker 103), the mounting location of mirror 101 relative to the center of the transducer, the properties of the transducer, the properties of mirror coupling member(s) 105, and the speed of rotation of viewing surface 119. It is understood that the present invention can be used to generate a three-dimensional pattern of virtually any size, the primary limitations on pattern size being the power of laser 115 and the diameter of viewing surface 119. Thus the present invention can be used to generate a pattern suitable for use in a desk display as well as a pattern suitable for viewing by a large group of people (e.g., a light show).

Figure 3:
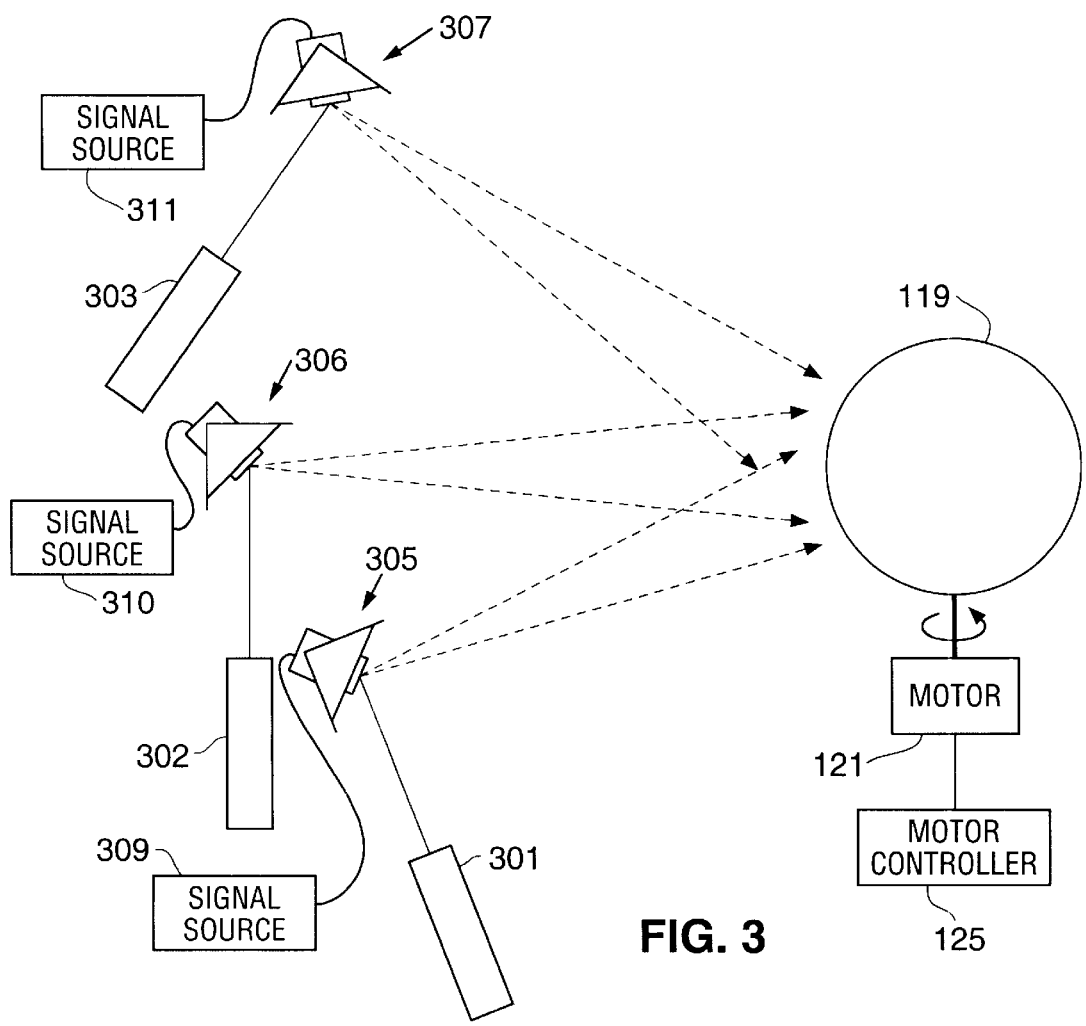
FIG. 3 is a schematic illustration of an alternate display system using multiple laser sources and multiple transducer/mirror pairs.

In order to generate more complex as well as multicolored patterns or images, multiple laser sources can be used as shown in FIG. 3. In the illustrated embodiment, three different laser sources 301–303 reflect light from three different transducer/mirror pairs 305–307 onto a single rotating viewing surface 119. By coupling each transducer/mirror pair to a different signal source 309–311, extremely complex patterns can be generated. Further complexity can be added by using different color laser sources 301–303. Preferably the wavelength of each laser source is controllable over a range of wavelengths, thereby providing additional pattern control.

Figure 4:
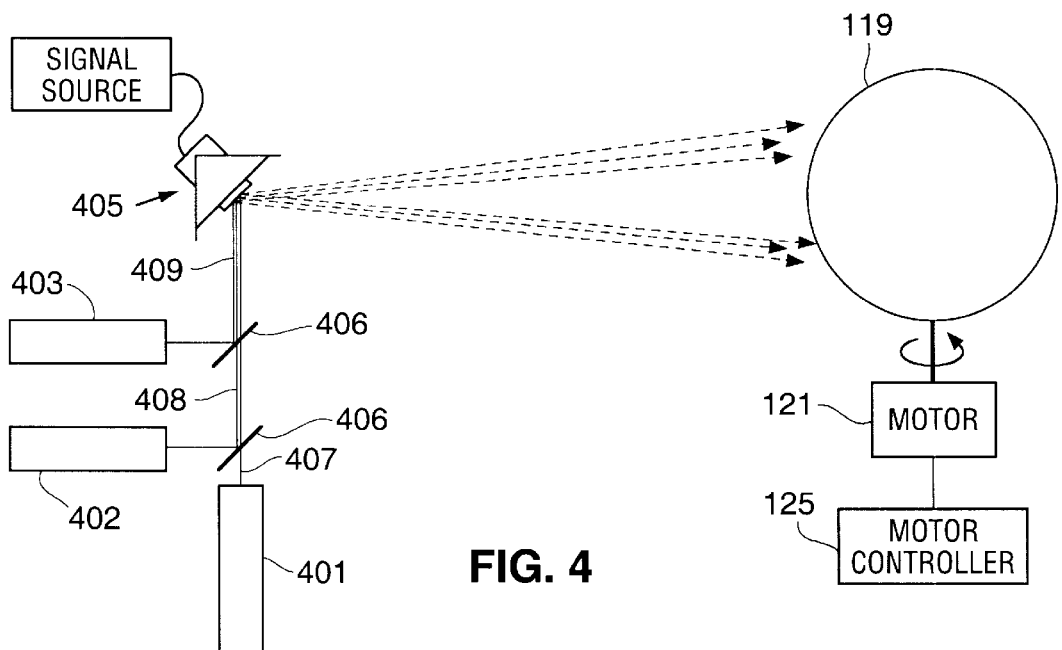
FIG. 4 is a schematic illustration of an alternate display system using multiple laser sources and a single transducer/mirror pair.

FIG. 4 illustrates an alternate embodiment of the invention using multiple laser sources 401–403 and a single transducer/mirror pair 405. As shown, wavelength sensitive beam combiners 406 are used to form a bundle of closely spaced light beams 407–409. Depending upon the desired pattern, light beams 407–409 can be coaxial, parallel but slightly offset from one another, or non-parallel and slightly angled from one another. As in the prior embodiments, a single rotating viewing surface 119 is used.

Figure 5:
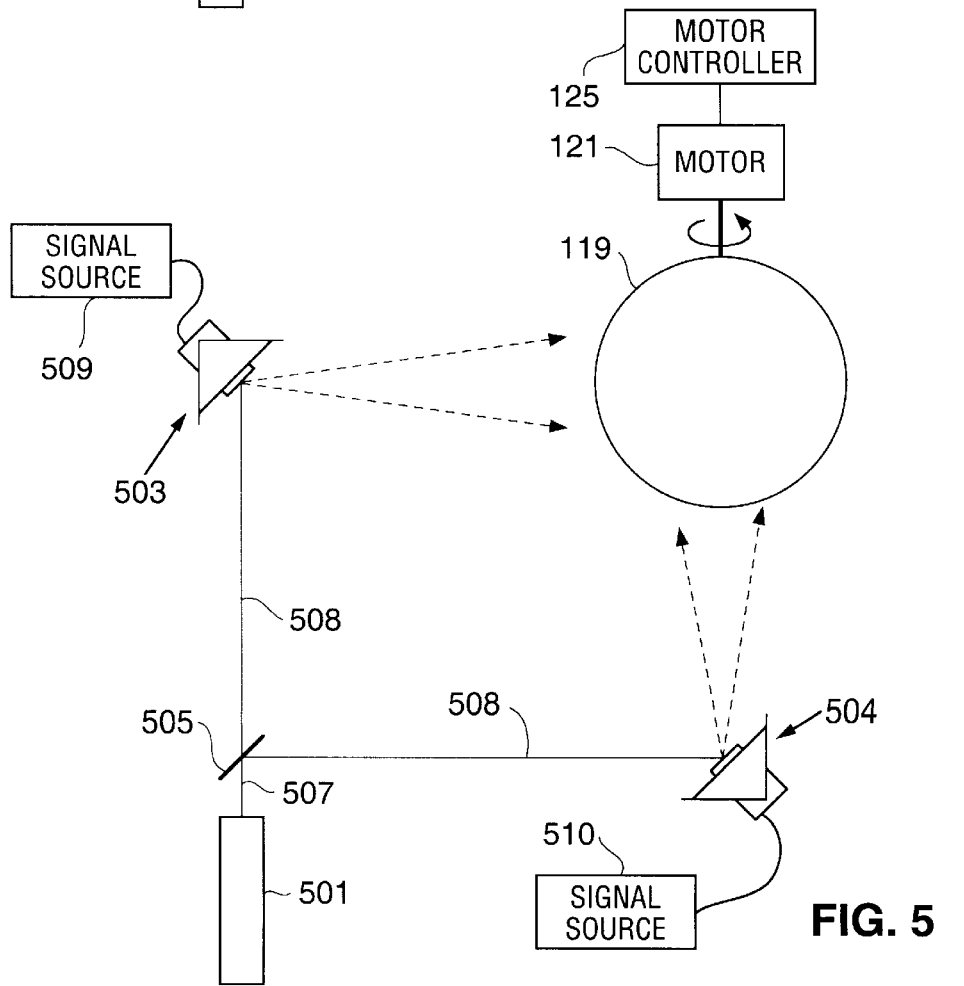
FIG. 5 is a schematic illustration of an alternate display system using a single laser source and multiple transducer/mirror pairs.

FIG. 5 illustrates an alternate embodiment of the invention using a single laser source 501 and multiple transducer/mirror pairs 503–504. As shown, two transducer/mirror pairs are used although it is understood that the invention is not so limited. One or more beam splitters 505 splits beam 507 into several beams 508, the number of beams 508 being equivalent to the number of transducer/mirror pairs. Each transducer/mirror pair is coupled to a different source 509–510, thus allowing independent signals to be driven into each transducer. Accordingly, complex patterns and images can be generated on rotating viewing surface 119.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A system for displaying a three-dimensional pattern, the system comprising:
   a light source emitting a beam of light;
   a reflective element, wherein said emitted beam of light is reflected by said reflective element;
   a transducer coupled to said reflective element;
   a signal source coupled to said transducer, wherein said transducer oscillates in response to an input signal from said signal source; and
   a rotating semi-transparent viewing surface, wherein said reflected beam impinges on said viewing surface, wherein said reflected beam forms the three-dimensional pattern on said rotating semi-transparent viewing surface.

2. The system of claim 1, further comprising a motor coupled to said viewing surface, said motor rotating said viewing surface.

3. The system of claim 1, wherein said light source is a laser.

4. The system of claim 1, wherein said transducer is a speaker.

5. The system of claim 1, wherein said signal source is selected from the group consisting of television tuners, radio tuners, CD players, tape decks, VCRs, musical instruments, and signal generators.

6. The system of claim 1, wherein a first portion of said reflected light beam passes through said viewing surface and a second portion of said reflected light beam is reflected by said viewing surface, and wherein said first portion is approximately equivalent to said second portion.

7. The system of claim 6, wherein said first portion is comprised of specular transmitted light and forward scattered light, and wherein said second portion is comprised of specular reflected light and back scattered light.

8. The system of claim 1, further comprising a second light source emitting a second beam of light, wherein said second beam of light is reflected by said reflective element.

9. The system of claim 8, further comprising an optical beam combiner, said optical beam combiner combining said beam of light from said light source with said second beam of light from said second light source.

10. The system of claim 9, wherein said beam of light from said light source is coaxial with said second beam of light from said second light source.

11. The system of claim 9, wherein said beam of light from said light source is offset from said second beam of light from said second light source.

12. The system of claim 9, wherein said beam of light from said light source impinges on said reflective element at an angle with respect to said second beam of light from said second light source.

13. A system for displaying a three-dimensional pattern, the system comprising:

a first light source emitting a first beam of light;

a first reflective element, wherein said first emitted beam of light is reflected by said first reflective element;

a first transducer coupled to said first reflective element;

a first signal source coupled to said first transducer, wherein said first transducer oscillates in response to an input signal from said first signal source;

a second light source emitting a second beam of light;

a second reflective element, wherein said second emitted beam of light is reflected by said second reflective element;

a second transducer coupled to said second reflective element;

a second signal source coupled to said second transducer, wherein said second transducer oscillates in response to an input signal from said second signal source; and a rotating semi-transparent viewing surface, wherein said first beam of light reflected by said first reflective element and said second beam of light reflected by said second reflective element impinge on said viewing surface to form the three-dimensional pattern.

14. The system of claim 13, wherein said first light source is a first laser emitting light of a first wavelength and said second light source is a second laser emitting light of a second wavelength.

15. A system for displaying a three-dimensional pattern, the system comprising:

a first light source emitting a first beam of light;

a beam splitter, wherein said beam splitter splits a second beam of light from said first beam of light;

a first reflective element, wherein said first beam of light is reflected by said first reflective element;

a first transducer coupled to said first reflective element;

a first signal source coupled to said first transducer, wherein said first transducer oscillates in response to an input signal from said first signal source;

a second reflective element, wherein said second beam of light is reflected by said second reflective element;

a second transducer coupled to said second reflective element;

a second signal source coupled to said second transducer, wherein said second transducer oscillates in response to an input signal from said second signal source; and a rotating semi-transparent viewing surface, wherein said first beam of light reflected by said first reflective element and said second beam of light reflected by said second reflective element impinge on said viewing surface to form the three-dimensional pattern.

16. A method of generating a three-dimensional pattern, the method comprising the steps of:

coupling a reflective element to a transducer;

reflecting a laser beam from said reflective element onto a semi-transparent viewing surface;

supplying an input signal to said transducer from a signal source, wherein said input signal causes said reflective element to oscillate; and rotating said semi-transparent viewing surface.

17. The method of claim 16, further comprising the step of reflecting a second laser beam from said reflective element onto said semi-transparent viewing surface.

18. The method of claim 16, further comprising the steps of:

splitting a second laser beam from said first laser beam; and reflecting said second laser beam from said reflective element onto said semi-transparent viewing surface.

19. The method of claim 16, further comprising the steps of:

coupling a second reflective element to a second transducer;

reflecting a second laser beam from said second reflective element onto said semi-transparent viewing surface; and supplying an input signal to said second transducer from a second signal source, wherein said input signal causes said second reflective element to oscillate.

* * * * *